Jan. 5, 1954
W. J. SMART
2,665,150
FASTENING DEVICE
Filed Feb. 19, 1952
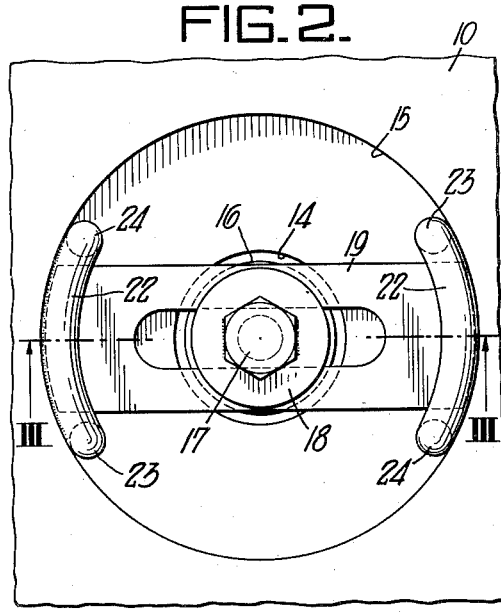
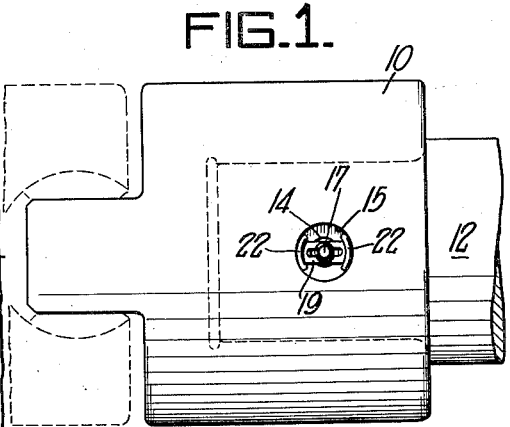
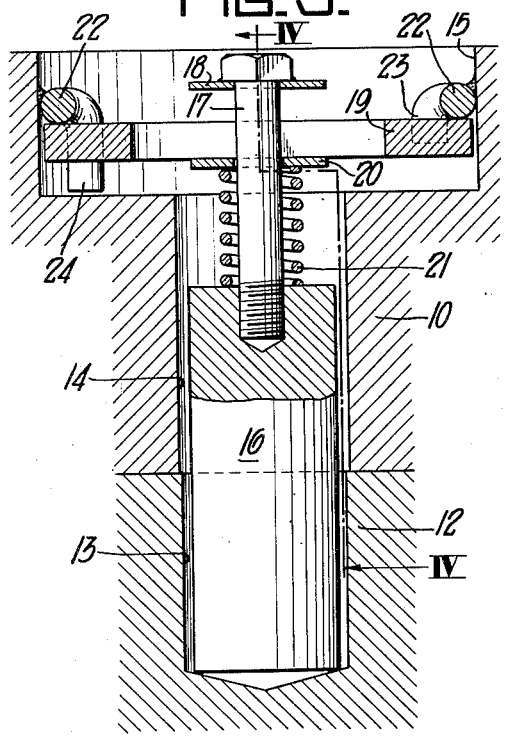
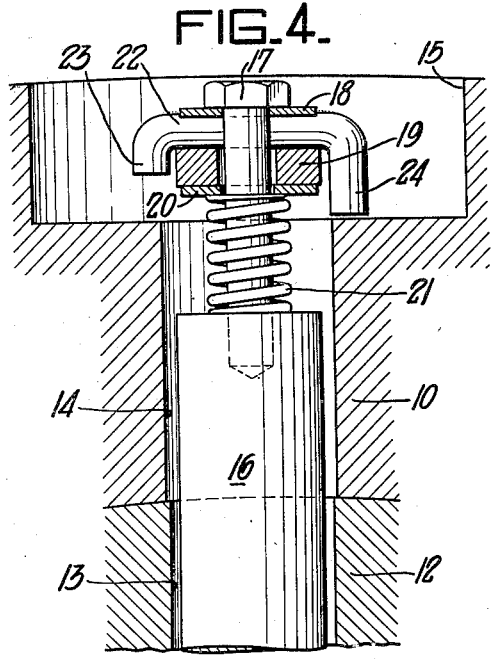
INVENTOR:
WILBUR J. SMART,
BY:
Donald G. Dalton
his Attorney.

Patented Jan. 5, 1954

2,665,150

UNITED STATES PATENT OFFICE 2,665,150

FASTENING DEVICE

Wilbur J. Smart, Springville, Utah, assignor to United States Steel Corporation, a corporation of New Jersey Application February 19, 1952, Serial No. 272,473

6 Claims. (Cl. 287—52)

This invention relates to an improved device for fastening collars or other sleeve-like members to shafts or the like, and is particularly applicable to rolling mills for fastening coupling-halves to roll wobblers.

An object of the invention is to provide an improved fastening device of the foregoing type which can be disconnected or engaged quickly and easily by hand without the need for any sort of tool.

A more specific object is to provide an improved fastening device which includes a freely insertable keeper pin for holding two members together and a spring-held, rotatable key plate for retaining the pin.

These and other objects will become more apparent after referring to the following specification and attached drawing, in which:

Figure 1 is an elevational view of a portion of a roll and a coupling-half equipped with improved fastening means embodying features of the present invention;

Figure 2 is an elevational view of the fastening means on a larger scale;

Figure 3 is a sectional view on line III—III of Figure 2; and

Figure 4 is a sectional view on line IV—IV of Figure 3.

The drawing shows a sleeve-like member 10, the longitudinal bore of which receives a shaft or the like 12, in this instance a universal coupling-half and a roll wobbler respectively. The wobbler is of non-circular cross-section, and the longitudinal bore in the coupling halve is correspondingly shaped, so that rotation of the coupling drives the roll. The fastening device of the present invention is employed to hold these parts against any appreciable relative longitudinal displacement. In a rolling mill the rolls must be changed often, and the coupling-halves are installed and removed with the rolls. The fastening device prevents their separation during installation and removal.

In accordance with the present invention, the wobbler 12 has a radial bore 13 and the coupling-half a mating radial bore 14 and a counterbore 15. A keeper pin 16 is freely inserted in bores 13 and 14 and extends from the inner end of bore 13 to a point somewhat short of the outer end of bore 14. A cap screw extension 17 of smaller diameter is joined to the outer end of said keeper pin. A stop 18, such as a washer, is fixed to the outer end of said cap screw. A slotted key plate 19 and a washer 20 are mounted for free sliding movement and rotation on the cap screw below said stop. A compression spring 21 encircles the cap screw and bears between the outer end of the keeper pin and the key plate through the washer 20. The stop 18 and washer 20 are large enough that they cannot pass through the slot in the key plate 19. The key plate is of rectangular outline, except that it has rounded ends, the radii of which correspond with the radius of the counterbore, allowing for the necessary working tolerances so that the plate can turn freely.

A pair of shoulder lugs 22 are welded to the coupling-half 10 inside its counterbore 15. These lugs are of like construction and preferably each is formed of a rod whose ends are bent downwardly to furnish a short length depending stop 23 and a longer depending stop 24. The middle portions of the lugs are curved to correspond with the curvature of the counterbore walls. The two lugs are positioned diametrically opposite each other in the counterbore. The spacing between the stops 23 and 24 is such as to allow the key plate 19 to fit loosely therebetween.

The fastening device is installed by inserting its keeper pin 16 in the bores 13 and 14 of the wobbler and coupling-half respectively. The key plate 19 is inserted in the counterbore 15 between the two lugs 22 and pushed far enough in against the compression of spring 21 so that it can clear the short length stops 23 on the two lugs. Next the key plate is rotated to a position such that its ends underlie the mid portions of the two lugs and then is released. The spring 21 holds the key plate against the lugs 22, whose stops 23 and 24 hold the key plate against unintended rotation. The fastening device is removed by reversing the steps just described. Preferably the spring 21 is sufficiently light that the fastening device can be installed or removed by hand without any sort of tool. However, this spring should be of sufficient length when compressed that the inner end of keeper pin 16 always remains within bore 13 of the wobbler 12, since centrifugal force tends to throw the keeper pin outwardly against the compression of this spring.

While one embodiment of my invention has been shown and described it will be apparent that other adaptations and modifications may be made without departing from the scope of the following claims.

I claim:

1. The combination, in a sleeve-like member having a longitudinal bore and a shaft received in said bore, said shaft having a radial bore and said sleeve-like member having a mating radial bore and a counterbore, of a fastening device comprising a pair of lugs fixed to said sleeve-like member inside said counterbore, a keeper pin received in said radial bores, an extension on the outer end of said keeper pin, a key plate slidably and rotatably received on said extension and underlying said lugs, and spring means holding said key plate against said lugs.

2. A combination as defined in claim 1 in which said lugs have depending stops on their undersides holding said key plate against unintended rotation.

3. A combination as defined in claim 1 in which said lugs each have a short length depending stop adjacent one end and a longer depending stop adjacent the other end holding said key plate against unintended rotation, and said key plate can be inserted and removed under said short length stops on compression of said spring means.

4. The combination, in a sleeve-like member having a longitudinal bore and a shaft received in said bore, said shaft having a radial bore and said sleeve-like member having a mating radial bore and a counterbore, of a fastening device comprising a pair of lugs fixed to said sleeve-like member inside said counterbore diametrically opposite each other, each of said lugs being formed of a rod whose ends are bent downwardly to form a short length stop and a longer stop, a keeper pin received in said radial bores and having a smaller diameter extension on its outer end, a stop on the outer end of said extension, a key plate slidably and rotatably received on said extension between said last named stop and said keeper pin and underlying said lugs between the stops thereon, and a compression spring encircling said extension and bearing between said keeper pin and said key plate, said key plate being insertable and removable under said short length stops on compression of said spring.

5. The combination in a coupling-half having a non-circular bore and a roll wobbler received in said bore and adapted to be driven by rotation of said coupling-half, said wobbler having a radial bore and said coupling-half having a mating radial bore and a counterbore, of a fastening device for preventing relative longitudinal movement between the coupling-half and the wobbler comprising a pair of lugs fixed to said coupling-half inside said counterbore diametrically opposite each other, each of said lugs being formed of a rod whose ends are bent downwardly to form a short length stop and a longer stop, a keeper pin received in said radial bores and having a smaller diameter extension on its outer end, a stop on the outer end of said extension, a key plate slidably and rotatably received on said extension between said last named stop and said keeper pin and underlying said lugs between the stops thereon, and a compression spring encircling said extension and bearing between said keeper pin and said key plate, said key plate being insertable and removable under said short length stops on compression of said spring.

6. As a subcombination of a fastening device, a cylindrical keeper pin, an extension on one end of said pin of smaller diameter than the pin, a key plate having an opening slidably and rotatably receiving said extension, a stop at the end of said extension preventing removal of said key plate, and a spring surrounding said extension and bearing at its opposite ends against said keeper pin and said key plate.

WILBUR J. SMART.

References Cited in the file of this patent

UNITED STATES PATENTS

| Number | Name | Date |
| --- | --- | --- |
| 226,113 | Rominger | Mar. 30, 1880 |
| 807,874 | Sheehan | Dec. 19, 1905 |
| 1,790,238 | Klein | Jan. 27, 1931 |
| 1,895,826 | Trudeau | Jan. 31, 1933 |
| 2,009,371 | Junge | July 23, 1935 |
| 2,448,278 | Ronning | Aug. 31, 1948 |
| 2,515,807 | Spooner | July 18, 1950 |